(12) United States Patent
Gorobets et al.

(10) Patent No.: US 7,395,404 B2
(45) Date of Patent: Jul. 1, 2008

(54) CLUSTER AUTO-ALIGNMENT FOR STORING ADDRESSABLE DATA PACKETS IN A NON-VOLATILE MEMORY ARRAY

(75) Inventors: Sergey Anatolievich Gorobets, Edinburgh (GB); Alan David Bennett, Edinburgh (GB)

(73) Assignee: SanDisk Corporation, Milpitas, CA (US)

( * ) Notice: Subject to any disclaimer, the term of this patent is extended or adjusted under 35 U.S.C. 154(b) by 303 days.

(21) Appl. No.: 11/015,211

(22) Filed: Dec. 16, 2004

(65) Prior Publication Data
US 2006/0136655 A1  Jun. 22, 2006

(51) Int. Cl.
*G06F 12/06* (2006.01)
(52) U.S. Cl. .......................................... 711/201; 711/1
(58) Field of Classification Search .................. 711/201
See application file for complete search history.

(56) References Cited

U.S. PATENT DOCUMENTS

| | | | |
|---|---|---|---|
| 4,139,911 A | 2/1979 | Sciulli et al. |
| 4,218,764 A | 8/1980 | Furuta et al. |
| 4,253,059 A | 2/1981 | Bell et al. |
| 4,460,982 A | 7/1984 | Gee et al. |
| 4,612,630 A | 9/1986 | Rosier |
| 4,694,454 A | 9/1987 | Matsuura |
| 4,703,196 A | 10/1987 | Arakawa |
| 4,703,453 A | 10/1987 | Shinoda et al. |
| 4,733,394 A | 3/1988 | Giebel |
| 4,763,305 A | 8/1988 | Kuo |
| 4,779,272 A | 10/1988 | Kohda et al. |
| 4,799,195 A | 1/1989 | Iwahashi et al. |
| 4,809,231 A | 2/1989 | Shannon et al. |
| 4,827,450 A | 5/1989 | Kowalski |
| 4,937,787 A | 6/1990 | Kobatake |
| 4,962,322 A | 10/1990 | Chapman |
| 4,964,079 A | 10/1990 | Devin |
| 5,043,940 A | 8/1991 | Harari |
| 5,065,364 A | 11/1991 | Atwood et al. |
| 5,070,032 A | 12/1991 | Yuan et al. |
| 5,095,344 A | 3/1992 | Harari |

(Continued)

FOREIGN PATENT DOCUMENTS

EP    0791933 B1    8/1997

(Continued)

OTHER PUBLICATIONS

Chang et al., "An Adaptive Striping Architecturefor Flash Memory Storage Systems of Embedded Systems", Proceedings of the Eighth IEEE Real-Time and Embedded Technology and Applications Symposium, Sep. 2002, IEEE, pp. 187-196.*

(Continued)

*Primary Examiner*—B. James Peikari
(74) *Attorney, Agent, or Firm*—Weaver Austin Villenevue Sampson LLP

(57) ABSTRACT

Alignment of clusters to pages is provided in a non-volatile memory system that receives data from a host in clusters and writes data to a memory array in units of a page. Alignment is implemented within each block using offsets in logical-to-physical mapping of data. Different blocks may have different offsets. When a host sends data with different cluster boundary locations, the data may be written with different offsets so that data maintains alignment.

23 Claims, 8 Drawing Sheets

U.S. PATENT DOCUMENTS

| | | | |
|---|---|---|---|
| 5,119,330 A | 6/1992 | Tanagawa | |
| 5,122,985 A | 6/1992 | Santin | |
| 5,132,935 A | 7/1992 | Ashmore, Jr. | |
| 5,151,906 A | 9/1992 | Sawada | |
| 5,157,629 A | 10/1992 | Sato et al. | |
| 5,172,338 A | 12/1992 | Mehrotra et al. | |
| 5,200,922 A | 4/1993 | Rao | |
| 5,200,959 A | 4/1993 | Gross et al. | |
| 5,239,505 A | 8/1993 | Fazio et al. | |
| 5,262,984 A | 11/1993 | Noguchi et al. | |
| 5,263,032 A | 11/1993 | Porter et al. | |
| 5,270,551 A | 12/1993 | Kamimura et al. | |
| 5,270,979 A | 12/1993 | Harari et al. | |
| 5,278,794 A | 1/1994 | Tanaka et al. | |
| 5,313,421 A | 5/1994 | Guterman et al. | |
| 5,313,427 A | 5/1994 | Schreck et al. | |
| 5,315,541 A | 5/1994 | Harari et al. | |
| 5,321,655 A | 6/1994 | Iwahashi et al. | |
| 5,327,383 A | 7/1994 | Merchant et al. | |
| 5,335,198 A | 8/1994 | Van Buskirk et al. | |
| 5,341,334 A | 8/1994 | Maruyama | |
| 5,343,063 A | 8/1994 | Yuan et al. | |
| 5,347,489 A | 9/1994 | Merchant et al. | |
| 5,365,486 A | 11/1994 | Schrek | |
| 5,377,147 A | 12/1994 | Merchant et al. | |
| 5,394,359 A | 2/1995 | Kowalski | |
| 5,404,485 A | 4/1995 | Ban | |
| 5,465,236 A | 11/1995 | Naruke | |
| 5,475,693 A | 12/1995 | Christopherson et al. | |
| 5,504,760 A | 4/1996 | Harari et al. | |
| 5,523,972 A | 6/1996 | Rashid et al. | |
| 5,532,962 A | 7/1996 | Auclair et al. | |
| 5,570,315 A | 10/1996 | Tanaka et al. | |
| 5,583,812 A | 12/1996 | Harari | |
| 5,598,370 A | 1/1997 | Niijima et al. | |
| 5,648,934 A | 7/1997 | O'Toole | |
| 5,652,720 A | 7/1997 | Aulas et al. | |
| 5,657,332 A | 8/1997 | Auclair et al. | |
| 5,661,053 A | 8/1997 | Yuan | |
| 5,675,537 A | 10/1997 | Bill et al. | |
| 5,689,465 A | 11/1997 | Sukegawa et al. | |
| 5,696,929 A | 12/1997 | Hasbun et al. | |
| 5,699,297 A | 12/1997 | Yamazaki et al. | |
| 5,703,506 A | 12/1997 | Shook et al. | |
| 5,712,815 A | 1/1998 | Bill et al. | |
| 5,717,632 A | 2/1998 | Richart et al. | |
| 5,751,639 A | 5/1998 | Ohsawa | |
| 5,761,125 A | 6/1998 | Himeno | |
| 5,774,397 A | 6/1998 | Endoh et al. | |
| 5,798,968 A | 8/1998 | Lee et al. | |
| 5,835,413 A | 11/1998 | Hurter et al. | |
| 5,835,927 A | 11/1998 | Fandrich et al. | |
| 5,860,091 A * | 1/1999 | DeKoning et al. | 711/114 |
| 5,890,192 A | 3/1999 | Lee et al. | |
| 5,905,673 A | 5/1999 | Khan | |
| 5,909,449 A | 6/1999 | So et al. | |
| 5,930,167 A | 7/1999 | Lee et al. | |
| 5,933,368 A | 8/1999 | Ma et al. | |
| 5,937,425 A | 8/1999 | Ban | |
| 5,963,473 A | 10/1999 | Norman | |
| 6,046,935 A | 4/2000 | Takeuchi et al. | |
| 6,049,899 A | 4/2000 | Auclair et al. | |
| 6,125,435 A | 9/2000 | Estakhri et al. | |
| 6,145,051 A | 11/2000 | Estakhri et al. | |
| 6,151,246 A | 11/2000 | So et al. | |
| 6,189,081 B1 | 2/2001 | Fujio | |
| 6,199,139 B1 | 3/2001 | Katayama et al. | |
| 6,222,762 B1 | 4/2001 | Guterman et al. | |
| 6,262,918 B1 | 7/2001 | Estakhri et al. | |
| 6,307,776 B1 | 10/2001 | So et al. | |
| 6,345,001 B1 | 2/2002 | Mokhlesi | |
| 6,415,352 B1 | 7/2002 | Asami et al. | |
| 6,426,893 B1 | 7/2002 | Conley et al. | |
| 6,434,658 B1 | 8/2002 | Fukuzumi | |
| 6,456,528 B1 | 9/2002 | Chen | |
| 6,459,644 B2 | 10/2002 | Mizushima et al. | |
| 6,522,580 B2 | 2/2003 | Chen et al. | |
| 6,560,152 B1 | 5/2003 | Cernea | |
| 6,567,307 B1 | 5/2003 | Estakhri | |
| 6,657,307 B2 | 12/2003 | Iwamoto | |
| 6,678,785 B2 | 1/2004 | Lasser | |
| 6,725,321 B1 | 4/2004 | Sinclair et al. | |
| 6,725,322 B1 | 4/2004 | Shiraishi et al. | |
| 6,760,255 B2 | 7/2004 | Conley et al. | |
| 6,763,424 B2 | 7/2004 | Conley | |
| 6,772,274 B1 | 8/2004 | Estakhri | |
| 6,829,167 B2 | 12/2004 | Tu et al. | |
| 6,898,662 B2 | 5/2005 | Gorobets | |
| 6,925,007 B2 | 8/2005 | Harari et al. | |
| 6,928,511 B2 | 8/2005 | Chiu | |
| 7,023,736 B2 | 4/2006 | Cernea et al. | |
| 2002/0099904 A1 * | 7/2002 | Conley | 711/103 |
| 2003/0065899 A1 | 4/2003 | Gorobets et al. | |
| 2003/0109093 A1 | 6/2003 | Harari | |
| 2003/0206449 A1 | 11/2003 | Harari et al. | |
| 2004/0083335 A1 | 4/2004 | Gonzalez et al. | |
| 2005/0144357 A1 | 6/2005 | Sinclair | |
| 2005/0144358 A1 | 6/2005 | Conley et al. | |
| 2005/0144360 A1 | 6/2005 | Bennett et al. | |
| 2005/0144363 A1 | 6/2005 | Sinclair | |
| 2005/0144365 A1 | 6/2005 | Gorobets et al. | |
| 2006/0133141 A1 | 6/2006 | Gorobets | |
| 2006/0161722 A1 | 7/2006 | Bennett et al. | |

FOREIGN PATENT DOCUMENTS

| | | |
|---|---|---|
| GB | 2289779 A | 11/1995 |
| JP | 8-147988 | 6/1996 |
| JP | 8-279295 | 10/1996 |
| JP | 2000-187992 | 7/2000 |
| WO | WO90/12400 | 10/1990 |
| WO | WO 200050997 A1 * | 8/2000 |
| WO | WO02/058074 | 7/2002 |

OTHER PUBLICATIONS

"The Merriam-Webster Dictionary", New Edition, 2005, Merriam-Webster Inc., p. 515.*

Unpublished U.S. Appl. No. 10/750,155, filed Dec. 30, 2003.

Unpublished U.S. Appl. No. 10/841,118, filed May 7, 2004.

Unpublished U.S. Appl. No. 11/016,285, filed Dec. 16, 2004.

Imamiya et al., "A 125-mm$^2$ 1-Gb NAND Flash Memory With 10-Mbyte/s Program Speed", IEEE Journal of Solid State Circuits, vol. 37, No. 11, Nov. 2002.

International Search Report and Written Opinion for related International Application No. PCT/US2005/043285, mailed May 8, 2006, 13 pages.

Lee et al., "Error Correction Technique for Multivalued MOS Memory," *Electronic Letters*, vol. 27, No. 15 (Jul. 18, 1991) pp. 1321-1323.

Examiner's Report for related European Patent Application No.: 05852506.4 dated Mar. 14, 2008 (8 pages).

* cited by examiner

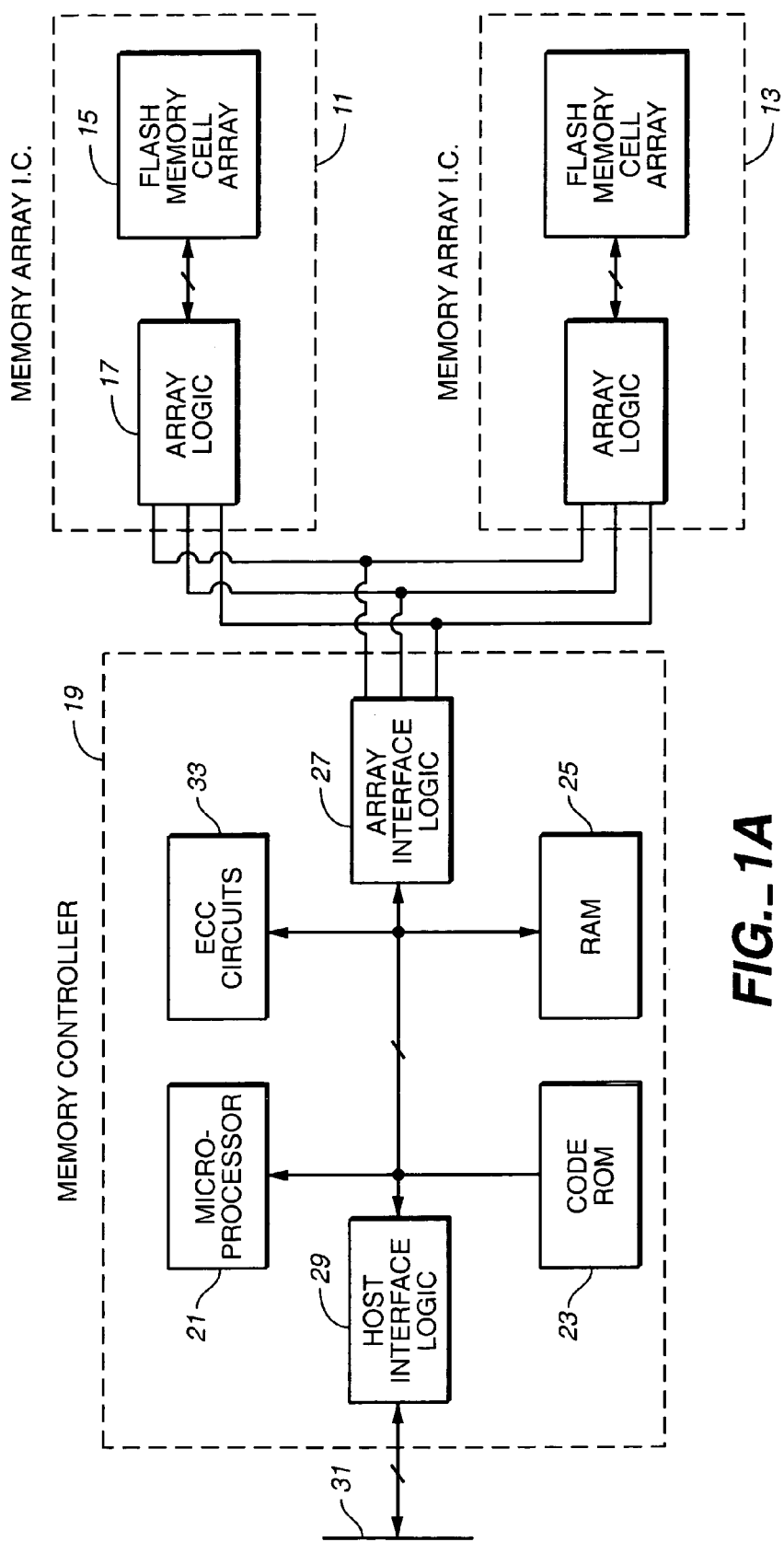
FIG._1A

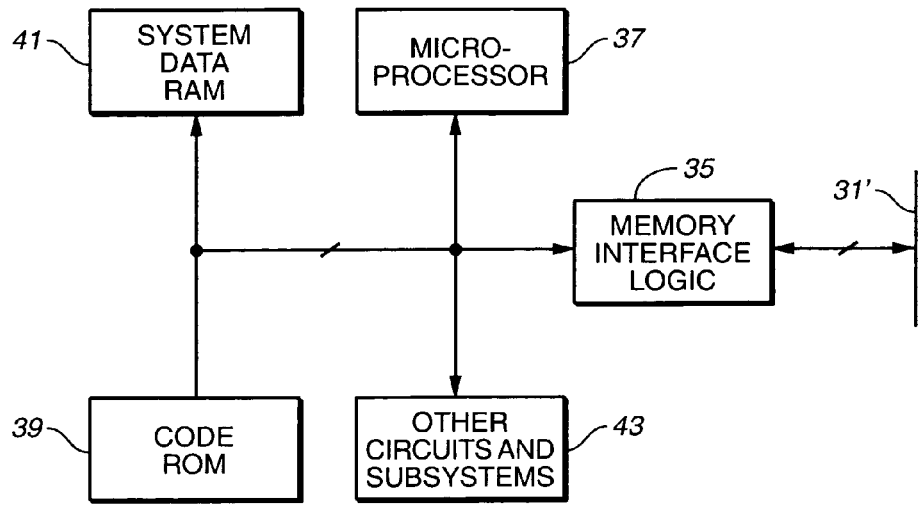
FIG._1B
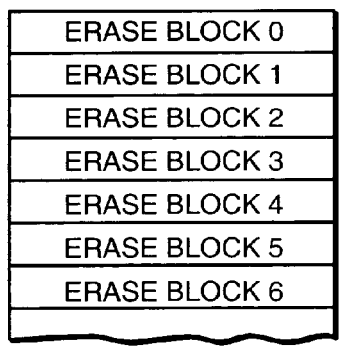
FIG._2
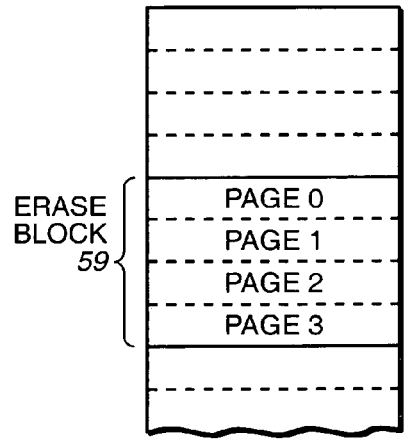
FIG._4
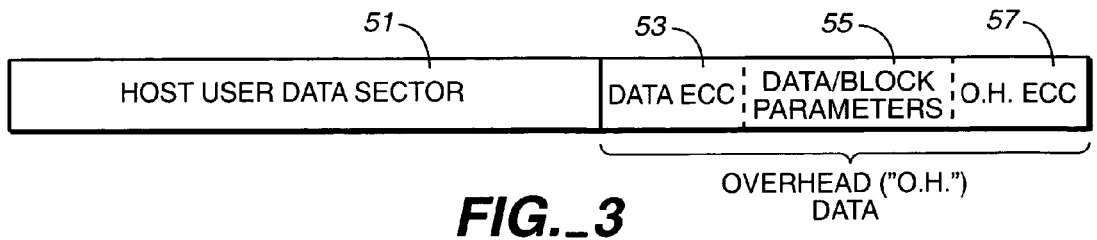
FIG._3

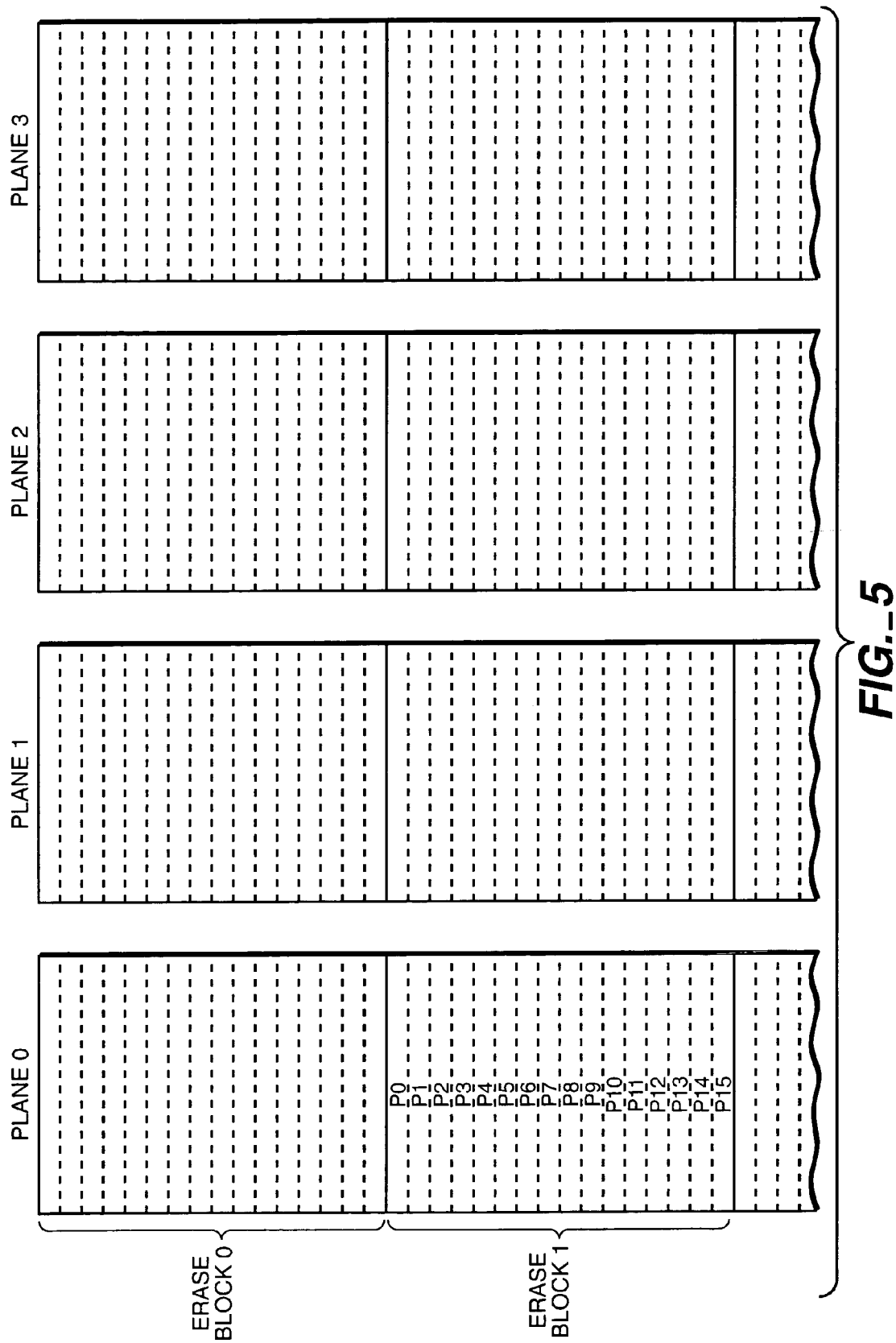
FIG._5

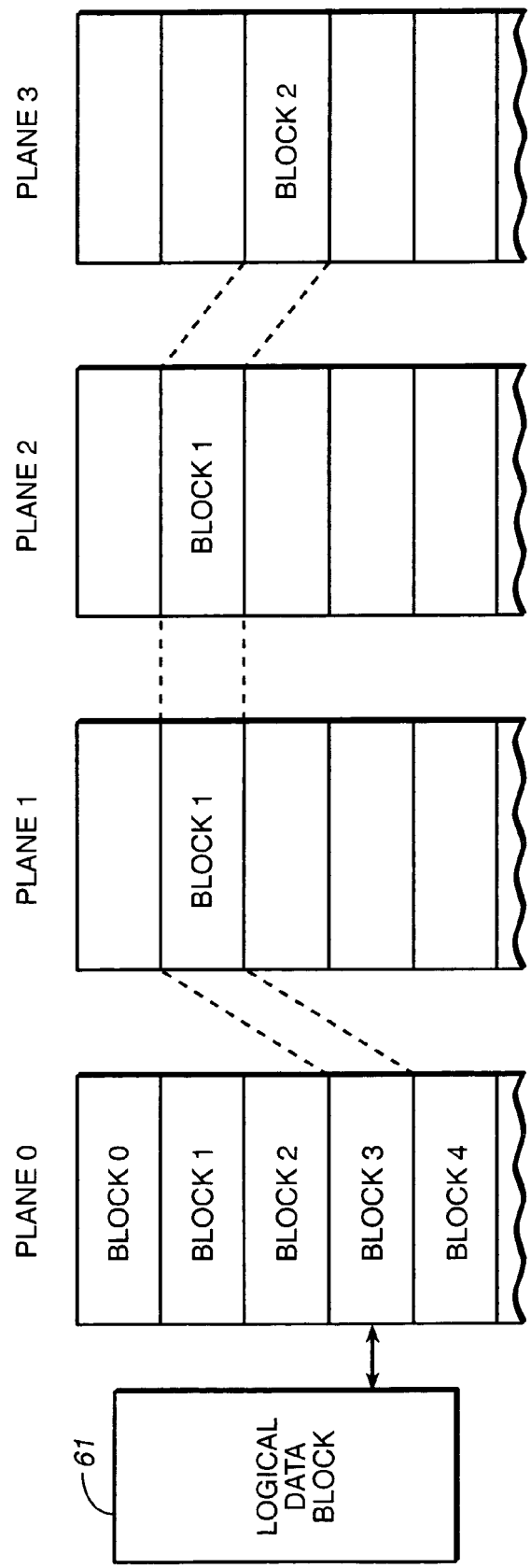
FIG._6

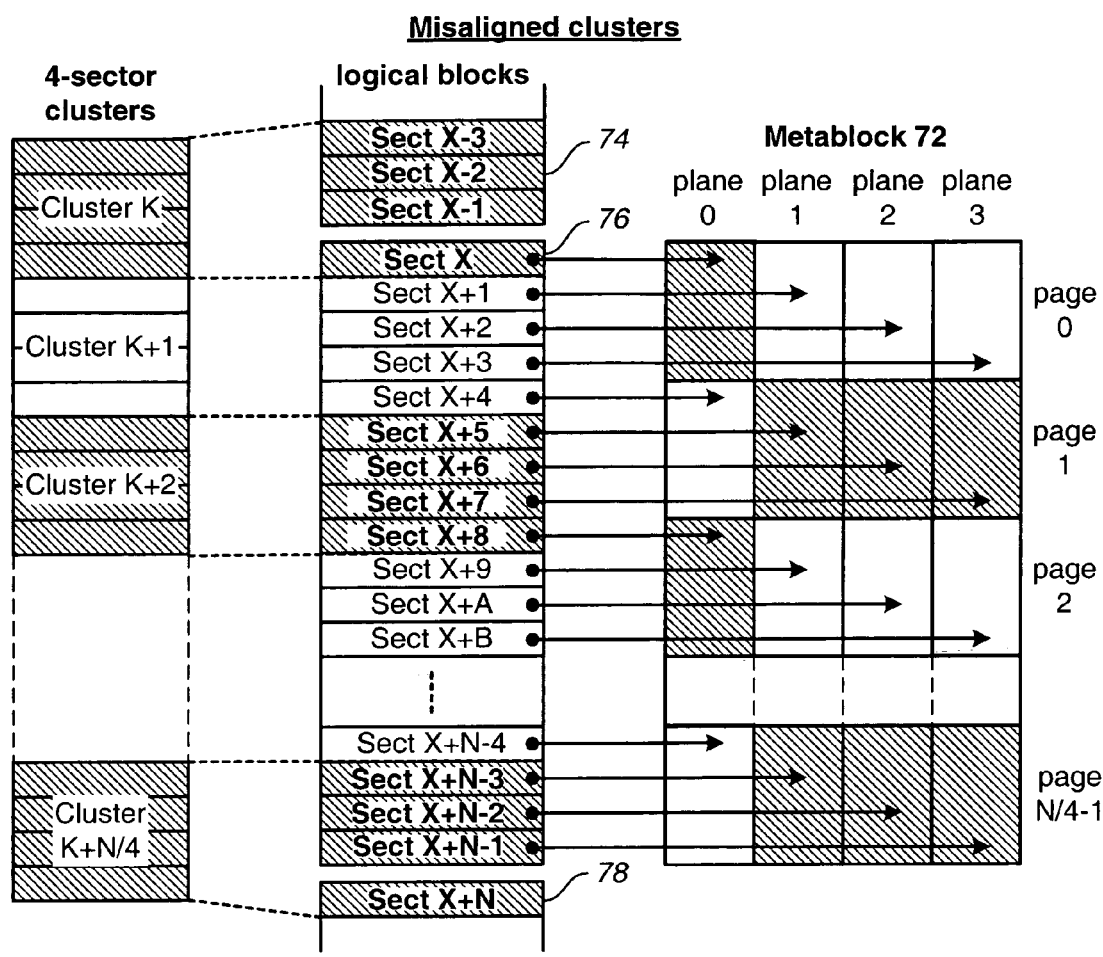
FIG._7

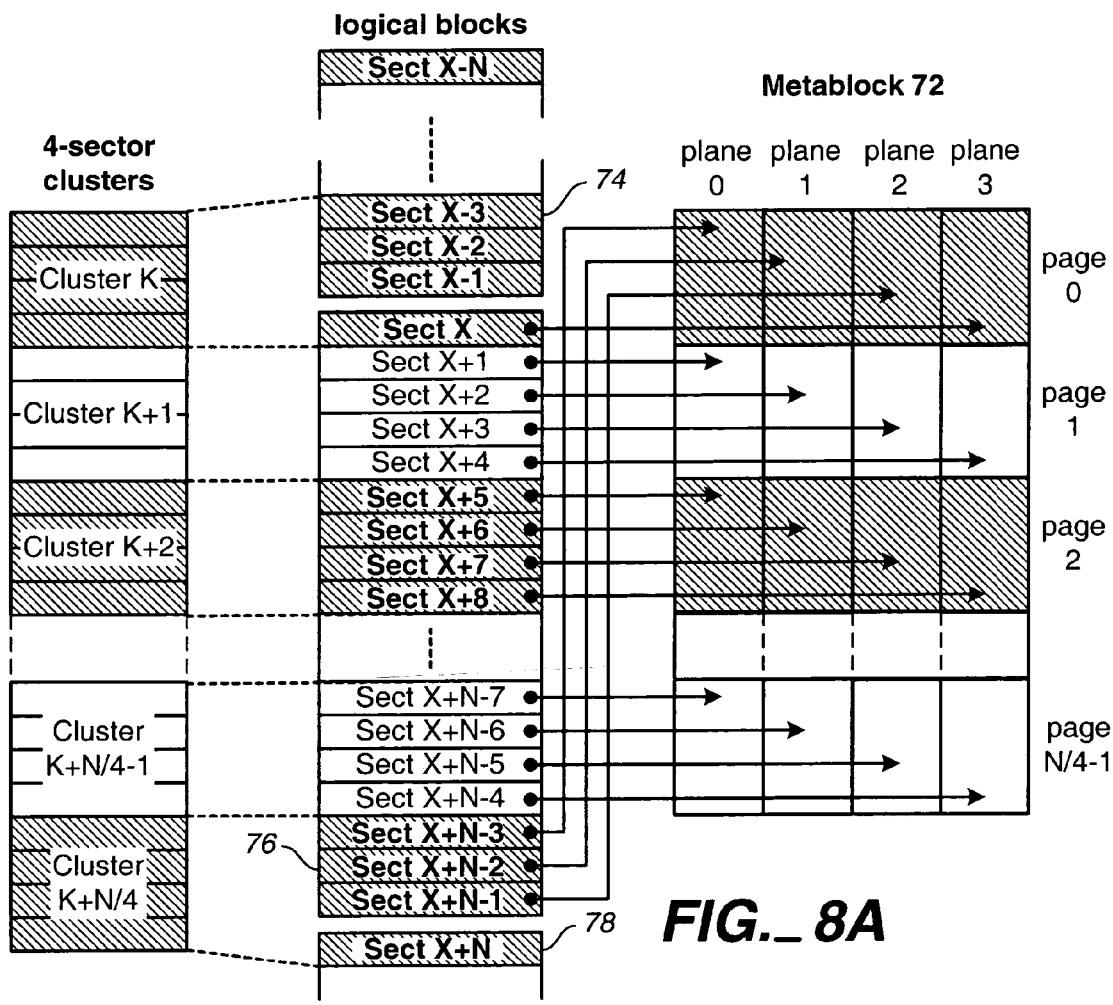
FIG._8A
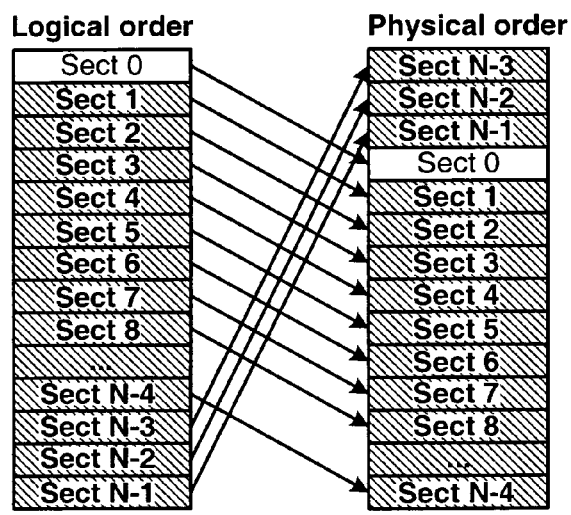
FIG._8B

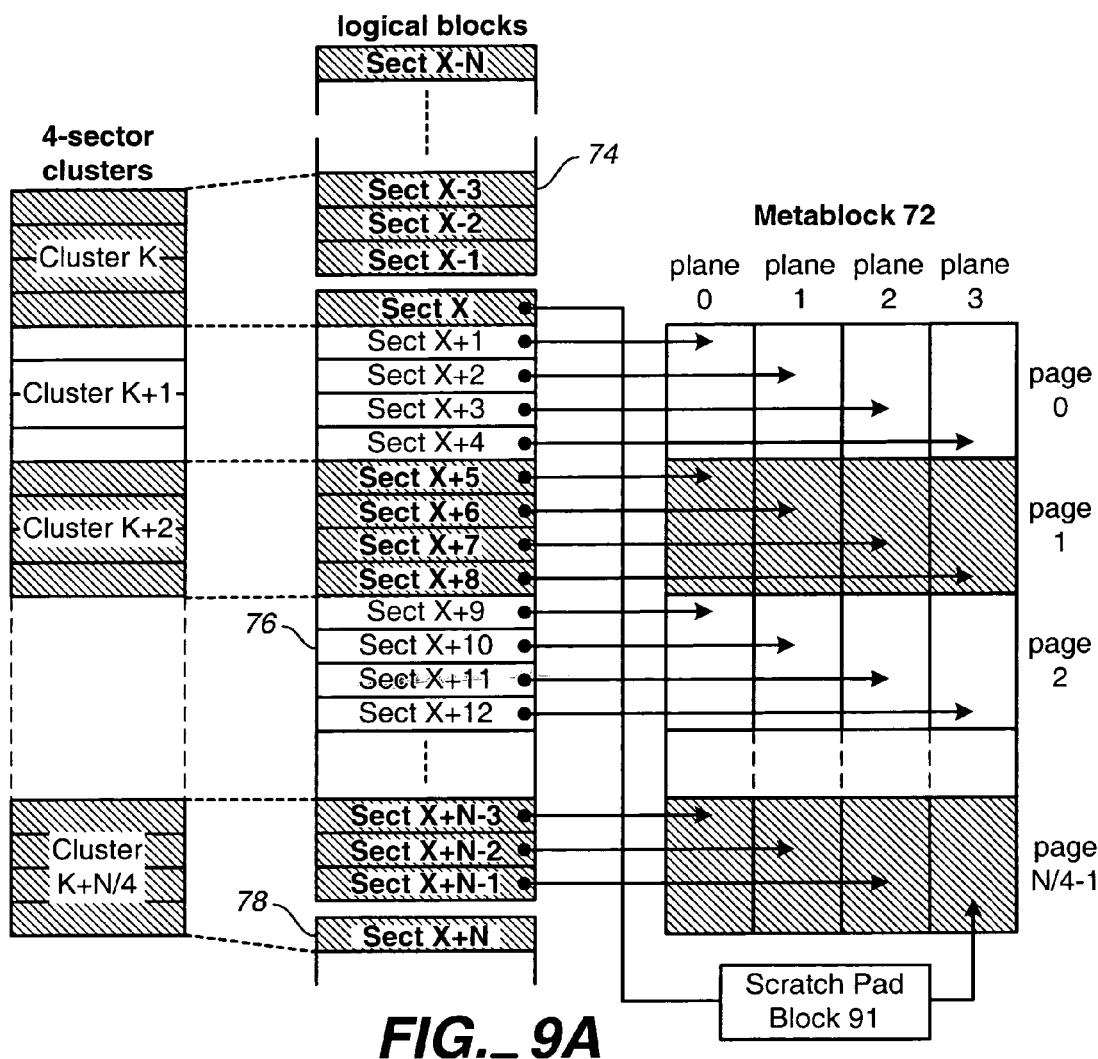
FIG._ 9A
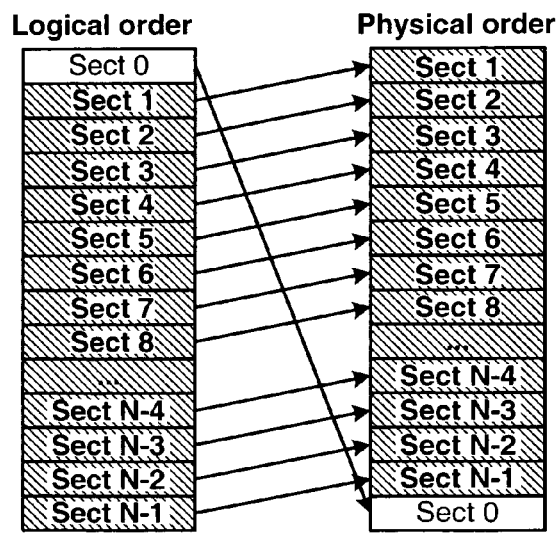
FIG._ 9B

CLUSTER AUTO-ALIGNMENT FOR STORING ADDRESSABLE DATA PACKETS IN A NON-VOLATILE MEMORY ARRAY

BACKGROUND

This invention relates generally to the operation of non-volatile memory systems, and, more specifically, to the handling of data within such memory systems.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure Digital (SD) cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. In some systems, a removable card does not include a controller and the host controls operation of the memory array in the card. Examples of this type of memory system include Smart Media cards and xD cards. Thus, control of the memory array may be achieved by software on a controller in the card or by control software in the host. Besides the memory card implementation, this type of memory can alternatively be embedded into various types of host systems. In both removable and embedded applications, host data may be stored in the memory array according to a storage scheme implemented by memory control software.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements are described in United States patent application publication no. 2003/0109093 of Harari et al.

Individual flash EEPROM cells store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window is commonly divided into a number of ranges, one for each of the two or more storage states of the memory cell. These ranges are separated by guardbands that include a nominal sensing level that allows determining the storage states of the individual cells. These storage levels do shift as a result of charge disturbing programming, reading or erasing operations performed in neighboring or other related memory cells, pages or blocks. Error correcting codes (ECCs) are therefore typically calculated by the controller and stored along with the host data being programmed and used during reading to verify the data and perform some level of data correction if necessary. Also, shifting charge levels can be restored back to the centers of their state ranges from time-to-time, by copying data to a new location where the data is rewritten with charge levels adjusted to be centered in their allowed ranges. This may be done before disturbing operations cause charge levels to shift completely out of their defined ranges and thus cause erroneous data to be read. This process, termed data refresh or scrub, is described in U.S. Pat. Nos. 5,532,962 and 5,909,449.

As in most integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned United States patent application publication no. 2003/0109093. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the erase block is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored. Such memories are typically configured with 16, 32 or more pages within each erase block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the erase blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes erase blocks from multiple planes, typically the same number of erase blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

To further efficiently manage the memory, erase blocks may be linked together to form virtual blocks or metablocks. That is, each metablock is defined to include one erase block from each plane. Use of the metablock is described in U.S. Pat. No. 6,763,424, which patent, along with all other patents and patent applications cited in this application, is hereby incorporated by reference in its entirety. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

Where a memory is connected to a host, certain inefficiencies may arise as a result of different data structures used by the memory system and host. Host systems typically manage data as clusters, where a cluster contains a fixed number of sectors. Typically, a cluster contains between 4 and 64 sectors of data, although other numbers of sectors are also possible. A host typically maintains a File Allocation Table (FAT) that records the allocation of data for a particular file on a cluster-by-cluster basis. Memory systems such as those of removable memory cards generally do not use clusters as a unit of data. In one example, a cluster of data is sent by a host to a memory card and the memory card returns a signal when the cluster of data is stored in the non-volatile memory. Then, the host sends the next cluster of data. There is generally no alignment between clusters and the pages used to store those clusters. This may mean that programming of a single cluster of data may require two write operations because the cluster extends into two pages of the memory, even though the cluster is capable of being written in a single page. This adds to the time needed to program data to the memory.

One possible solution to this problem, where a cluster extends from a first to a second page, is to save the portion of the cluster that is to be saved in the second page in a volatile memory such as a Random Access Memory (RAM) and return a signal to the host indicating that the cluster has been written. When the next cluster is received, the data in RAM may be copied and written with a portion of the new cluster to the second page as part of a full-page write. The remainder of the next cluster is stored in RAM as before. However, according to some standards, storage of data in RAM in this way is not permitted because of the risk of losing such data in the event of a loss of power to the memory.

Another solution is to implement an offset so that the physical-to-logical mapping of sectors is changed by a constant value to align cluster boundaries with page boundaries. However, if the host system changes the locations of the cluster boundaries, for example, for test purposes, then the data will be misaligned and alignment would require moving all the data stored in the memory. The formatting process is normally done without taking into account the previous format parameters, like number of FAT copies and cluster size. There is no direct control over the final offset between clusters and memory pages during formatting. As the result, the offset may differ after formatting. Thus, this technique has some drawbacks.

Therefore, there is a need for a method of aligning host units of data (such as clusters) to pages of a memory array so that the boundaries of the host units of data are aligned with page boundaries. There is also a need for a method that does this in a manner that safeguards host data from being lost if power is removed. There is also a need for a method that does this in a manner that is flexible and allows for changes in cluster boundary locations in data sent by a host.

SUMMARY

A method of aligning clusters of host data to pages of a memory array uses an offset for storage of data in a block of the memory array. Using an offset, sectors are stored at locations in the memory array that are displaced from the locations that they would otherwise be stored at. The offset may be implemented on a block-by-block basis. Thus, there is no change in the range of logical addresses (logical block) mapped to a particular block of the memory array, the offset only affects how that data is arranged within the block. Therefore, if there is a change in offset from one portion of data to another (for example, if the host changes cluster boundary locations for test reasons), then the different portions may be written with different offsets.

Because cluster boundaries are not generally aligned to logical block boundaries, a logical block generally begins and ends with a cluster fragment and contains a number of complete clusters in the middle.

In one example, the cluster fragment from the start of a logical block is written at the end of a first page. Then, the complete clusters are written in an aligned manner to subsequent pages. The cluster fragment from the end of the logical group is then written to the first page, thus filling the first page. Alternatively, the cluster fragment from the start of the logical block may be written to the last page of the block, complete clusters may be written to the remaining pages, and then the cluster fragment from the end of the logical block is written to the final page. However, some memory designs do not allow a page to be written more than once because of the risk of corrupting previously written data during a later write operation. Also, some designs do not allow pages to be filled non-sequentially.

In another example, a cluster fragment from the start of a logical block is stored in a scratch pad block or other location outside the block in which it is to be stored. The complete clusters that follow are then stored in the pages of the block in an aligned manner. The final cluster fragment is written to the final page of the block along with the cluster fragment from the start of the logical block, which is copied from the scratch pad block. This scheme allows pages to be written sequentially, with each page written just once.

The techniques of the present invention may be used for a block that is one erase block or a block that includes multiple erase blocks linked to form a metablock. The techniques may be applied to various sizes of clusters and pages and is not limited to the case where cluster size is the same as page size.

BRIEF DESCRIPTION OF THE DRAWINGS

FIG. 1A shows a memory system including a memory controller and memory array integrated circuits.

FIG. 1B shows a host system that operates with the memory system of FIG. 1A.

FIG. 2 shows an example organization of the memory array of FIG. 1A.

FIG. 3 shows an example host data sector with overhead data as stored in the memory array of FIG. 1A.

FIG. 4 shows a second example organization of the memory array of FIG. 1A;

FIG. 5 shows a third example organization of the memory array of FIG. 1A;

FIG. 6 shows an extension of the third example organization of the memory array of FIG. 1A

FIG. 7 shows correspondence between logical units and physical locations for data stored in a memory array such as that of FIG. 1A.

FIG. 8A shows correspondence between logical units and physical locations for data stored in a memory array according to an embodiment of the present invention.

FIG. 8B shows the operation of an offset in logical-to-physical mapping in the example of FIG. 8A.

FIG. 9A shows correspondence between logical units and physical locations for data stored in a memory array according to another embodiment of the present invention.

FIG. 9B shows the operation of an offset in logical-to-physical mapping in the example of FIG. 9A.

DESCRIPTION

Memory Architectures and their Operation

Figure 10:
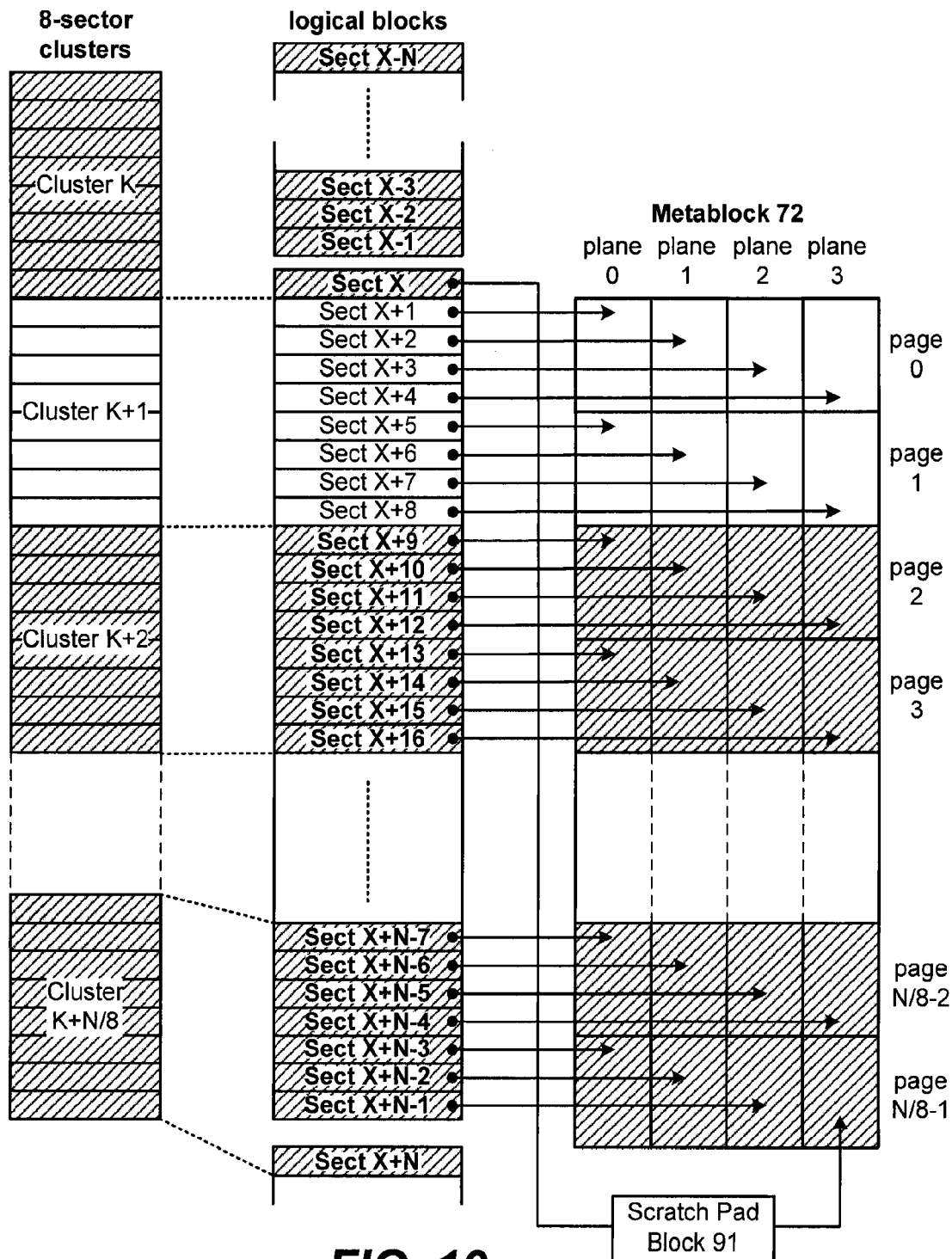
FIG. 10 shows how a cluster of 8 sectors may be aligned to pages having 4 sectors.

Referring initially to FIG. 1A, a flash memory includes a memory cell array and a controller. In the example shown, two integrated circuit devices (chips) 1 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. A memory cell array may be located on a single chip or may be comprised of memory cells on multiple chips. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Buffer memory 25 may be either volatile or non-volatile memory. Circuits 27 interface with the memory array chip(s) and circuits 29 interface with a host though connections 31.

The connections 31 of the memory of FIG. 1A mate with connections 31' of a host system, an example of which is given in FIG. 1B. Data transfers between the host and the memory of FIG. 1A are through interface circuits 35. A typical host also includes a microprocessor 37, a ROM 39 for storing firmware code and RAM 41. Other circuits and subsystems 43 often include a high capacity magnetic data storage disk drive, interface circuits for a keyboard, a monitor and the like, depending upon the particular host system. Some examples of such hosts include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

The memory of FIG. 1A may be implemented as a small enclosed card containing the controller and all its memory array circuit devices in a form that is removably connectable with the host of FIG. 1B. That is, mating connections 31 and 31' allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1A may be embedded within the host of FIG. 1B, wherein the connections 31 and 31' are permanently made. In this case, the memory is usually contained within an enclosure of the host along with other components. As a further alternative, a memory chip such as memory chip 11 may connect directly to connections 31' of the host system without a memory controller between them. In this case, the functions of the memory controller are performed by microprocessor 37 of the host system.

FIG. 2 illustrates a portion of a memory array wherein memory cells are grouped into erase blocks, the cells in each erase block being erasable together as part of a single erase operation, usually simultaneously. An erase block is the minimum unit of erase.

The size of the individual memory cell erase blocks of FIG. 2 can vary but one commercially practiced form includes a single sector of data in an individual erase block. The contents of such a data sector are illustrated in FIG. 3. User data 51 are typically 512 bytes. In addition to the user data 51 are overhead data that includes an ECC 53 calculated from the user data, parameters 55 relating to the sector data and/or the erase block in which the sector is programmed and an ECC 57 calculated from the parameters 55 and any other overhead data that might be included. Alternatively, a single ECC may be calculated from both user data 51 and parameters 55.

The parameters 55 may include a quantity related to the number of program/erase cycles experienced by the erase block, this quantity being updated after each cycle or some number of cycles. When this experience quantity is used in a wear leveling algorithm, logical block addresses are regularly re-mapped to different physical block addresses in order to even out the usage (wear) of all the erase blocks. Another use of the experience quantity is to change voltages and other parameters of programming, reading and/or erasing as a function of the number of cycles experienced by different erase blocks.

The parameters 55 may also include an indication of the bit values assigned to each of the storage states of the memory cells, referred to as their "rotation". This also has a beneficial effect in wear leveling. One or more flags may also be included in the parameters 55 that indicate status or states. Indications of voltage levels to be used for programming and/or erasing the erase block can also be stored within the parameters 55, these voltages being updated as the number of cycles experienced by the erase block and other factors change. Other examples of the parameters 55 include an identification of any defective cells within the erase block, the logical address of the data that is mapped into this physical block and the address of any substitute erase block in case the primary erase block is defective. The particular combination of parameters 55 that are used in any memory system will vary in accordance with the design. Also, some or all of the overhead data can be stored in erase blocks dedicated to such a function, rather than in the erase block containing the user data or to which the overhead data pertains.

Different from the single data sector erase block of FIG. 2 is a multi-sector erase block of FIG. 4. An example erase block 59, still the minimum unit of erase, contains four pages 0-3, each of which is the minimum unit of programming. One or more host sectors of data are stored in each page, usually along with overhead data including at least the ECC calculated from the sector's data and may be in the form of the data sector of FIG. 3.

Re-writing the data of an entire erase block usually involves programming the new data into an available erase block of an erase block pool, the original erase block then being erased and placed in the erase pool. When data of less than all the pages of an erase block are updated, the updated data are typically stored in a page of an erase block from the erased block pool and data in the remaining unchanged pages are copied from the original erase block into the new erase block. The original erase block is then erased. Variations of this large block management technique include writing the updated data into a page of another erase block without moving data from the original erase block or erasing it. This results in multiple pages having the same logical address. The most recent page of data is identified by some convenient technique such as the time of programming that is recorded as a field in sector or page overhead data.

A further multi-sector erase block arrangement is illustrated in FIG. 5. Here, the total memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each erase block in the example system of FIG. 5 contains 16 pages P0-P15, each page having a capacity of one, two or more host data sectors and some overhead data.

Yet another memory cell arrangement is illustrated in FIG. 6. Each plane contains a large number of erase blocks. In order to increase the degree of parallelism of operation, erase blocks within different planes of a chip, or from different chips are logically linked to form metablocks. One such metablock is illustrated in FIG. 6. Each metablock is logically addressable and the memory controller assigns and keeps track of the erase blocks that form the individual metablocks. The host system provides data in the form of a stream of sectors. This stream of sectors is divided into logical blocks. Here, a logical block is a logical unit of data that contains the same number of sectors of data as are contained in a metablock of the memory array. The memory controller maintains a record of the location where each logical block is stored. Such a logical block 61 of FIG. 6, for example, is identified by a logical block addresses (LBA) that is mapped by the controller into the physical block numbers (PBNs) of the blocks that make up the metablock. All blocks of the metablock are erased together, and pages from each block are generally programmed and read simultaneously. A group of pages from different erase blocks of a metablock programmed in parallel may be considered a metapage. This may be considered the unit of programming of a memory system that uses a metablock architecture. Programming of data using large metapages that extend across multiple erase blocks of a metablock provides a high degree of parallelism and thus allows a high rate of data storage.

In systems using a metablock architecture, a group of erase blocks forming a metablock may be treated as a single erase block and may be referred to simply as a block. Similarly, a group of pages extending across the erase blocks of a metablock may be treated as a single page (or metapage). Certain techniques described in this application may be carried out in both architectures that link erase blocks to form metablocks and those that do not link erase blocks to form metablocks. Thus, the term "block," as used in this application, may refer to either a single erase block, or a group of erase blocks linked to form a metablock. Similarly, the term "page," as used in this application, may refer to either a page of an individual erase block or a metapage that extends across the erase blocks of a metablock.

FIG. 7 shows an example of misalignment of clusters stored in a metablock 72 having four sectors per metapage. Data is received from a host as a series of clusters, with each cluster comprising 4 sectors. Cluster K extends across two logical blocks. Thus, part of cluster K (sectors X−3 to X−1) is in a first logical block 74 while part of cluster K (sector X) is in a second logical block 76. Because sector X is the first sector of the second logical block, it is stored in the first page (page 0) of metablock 72. A signal may be sent to the host when sector X is written, indicating that writing of cluster K is complete. The host may then send cluster K+1. The first part of cluster K+1 (sectors X+1, X+2 and X+3) is stored in page 0 with sector X. However, because a page stores only 4 sectors of data, sector X+4 must be stored in the next page (page 1). Sector X+4 may be stored in a buffer prior to being written to page 1. Thus, a second page write operation is needed to store cluster K+1. Similarly, subsequent clusters K+2 to K+N/4 each require two write operations because each cluster extends into two pages due to misalignment between clusters and pages. The final cluster of logical block 76 (cluster K+N/4) is partially written to the first page of a third metablock 78. Thus, the misalignment is continued throughout subsequent metablocks. Because each cluster requires two write operations in this example, the time to store data may be considerably longer than it would be if each cluster were written in a single write operation. This problem may also exist where a cluster does not contain the same amount of data as a page. For example, if a cluster is smaller than a page then some clusters may be written in a single page while others extend into two pages. If a cluster is larger than a page, some pages may contain only data from one cluster while some contain data from two clusters. Thus, a cluster that is twice as large as a page may require three write operations.

FIG. 8A shows an example of alignment of host clusters with pages of metablock 72 according to an embodiment of the present invention. As before, a host sends a series of clusters of data K to K+N/4, in sequential order, for storage in a memory. The memory includes multiple metablocks where a metablock is made up of multiple erase blocks that may be programmed and erased together. A unit of data corresponding to a metablock is a logical block. The clusters of data K to K+N/4 extend across 3 logical blocks 74, 76, 78. When sector X of cluster K is received, it is stored in the first page (page 0) of the metablock 72. The location shown for sector X indicates that it is in the last location in page 0. Subsequently, when sectors X+1 to X+4 of cluster K+1 are received, they are stored in page 1. Cluster K+1 is aligned to page 1 so that the boundary between cluster K and cluster K+1 (boundary between sector X and sector X+1) is located at the page boundary between page 0 and page 1. Thus, the start of cluster K+1 begins at the start of page 1 and the cluster K+1 is considered to be aligned to page 1. In this example, the size of a cluster is the same as the size of a page so that cluster K+1 fits page 1 with the end of cluster K+1 also coinciding with the end of page 1. Cluster K+2 is likewise aligned to page 2. Similarly, subsequent clusters K+3 to K+N/4−1 are aligned to respective pages 3 to N/4−4. Subsequent to writing cluster K+N/4−1 to page N/4−1, cluster K+N/4 is received from the host. Sectors X+N−3, X+N−2 and X+N−1 are stored in the first page (page 0) of metablock 72 with sector X. Thus, metablock 72 has a first page (page 0) that contains a partial cluster from the head of logical block 76 and a partial cluster from the tail of logical block 76. The other pages of the metablock contain one cluster each so that only one write operation is required for each of these pages. This may allow faster writing of data to the memory array compared with certain prior art systems.

The offset in this example may be calculated from the difference between the current command's first logical address and the logical address of the first sector in the logical block. An equation for calculating this offset is:

$$\text{Offset} = \left\{ \begin{pmatrix} \text{current command's} \\ \text{first logical address} \end{pmatrix} \bmod \begin{pmatrix} \text{number of sectors} \\ \text{per page} \end{pmatrix} \right\} - (\text{number of sectors per page})$$

Thus, for the example of FIG. 8A the calculation becomes:

Offset={(X−3) mod (4)}−4=1−4=−3

FIG. 8B illustrates the realignment scheme of FIG. 8A as an offset in the logical-to-physical mapping of sectors of logical block 76 where X=0. Instead of writing the first logical sector of logical block 76 (sector X) to the first physical address in metablock 72, the first logical sector is written to the fourth physical address. This may be considered an offset of −3 (minus three) in the mapping of this sector, where zero offset is mapping of the first logical sector to the first physical location. This may also be considered an offset of N−3 because the sector stored in the first physical location is sector N−3. Subsequent sectors are also written with an offset of −3 until the end of metablock 72 is reached. The last three sectors of logical block 76, X+N−3, X+N−2 and X+N−1 are then written to the start of metablock 72. These sectors may also be considered to be written with an offset of −3 where the logical addresses of the metablock wrap-around (the first address of the logical block is considered sequential to the last address of the logical block). Thus, sectors of data stored in metablock 72 may be found using the offset of logical block 76 and no sector-by-sector indexing of data is required. Storage of data in metablocks using an offset (or page-tag) of this kind is further described in patent application Ser. No. 10/750,155, entitled, "Non-volatile memory and method with block management system," filed on Dec. 30, 2003, which application is hereby incorporated by reference in its entirety. While the example of FIGS. 8A and 8B show three sectors (X+N−3, X+N−2 and X+N−1) that are wrapped-around from the end of logical block 76 to be stored at the start of metablock 72, the number of sectors wrapped-around in this way may be from one to three. The size of the offset for a given logical block may be from one to one less than the number of sectors in a page.

Certain memory designs do not allow multiple writing operations to the same page of a block. In memories of this type, once data has been written to a page, that page may not have additional data written to it because subsequent programming could corrupt the stored data. In memories of this type, the storage scheme shown in FIG. 8A might not be possible because after programming sector X, subsequent programming of sectors X+N−3, X+N−2 and X+N−1 in page 0 may not be possible. Also, in some designs, pages may only be written in sequential order. For example, page 0 is written first, then page 1, page 2 etc. After page 1 is written page 0 may not be written because this is not sequential. In such designs, writing of any data in page 0, after writing pages 1 to page N/4−1 may not be possible.

FIG. 9A shows another embodiment of the present invention that uses a scratch pad block 91 to implement an alignment scheme to align clusters and pages. The use of a scratch pad block is described in US patent application entitled "Scratch pad block," having an attorney docket number SNDK.406US0, filed on the same day as the present application, which patent application is hereby incorporated by reference in its entirety. As in the previous example, a series of clusters of host data (clusters K to K+N/4) are received from a host for storage in a memory array. Cluster K includes sectors X+3 to X+1 from a first logical block 74 and sector X from a second logical block 76. Sectors X+3 to X+1 are stored in a metablock (not shown) associated with the first logical block 74. Sector X is not immediately stored in metablock 72 when it is received. Instead, sector X is stored at another location. In this example, the location is in a scratch pad block 91. This is a block of the memory array that is used for short-term storage of various data in non-volatile memory. Because sector X is stored in non-volatile memory, it will not be lost if power is removed from the memory system. Alternatively, sector X may be stored in some other non-volatile memory or, if permitted, in a volatile memory. After sector X is stored in scratch pad block 91, cluster K+1 is received. Cluster K+1 is stored in page 0 and is aligned to page 0. Thus, the boundary between cluster K and cluster K+1 coincides with the starting boundary of page 0. Because the size of a cluster and the size of a page are the same in this example, cluster K+1 fits page 0 exactly and the end of cluster K+1 coincides with the end of page 0. Similarly, subsequent clusters K+2 to K+N/4+1 are written one to a page. When cluster K+N/4 is received, the three sectors from cluster K+N/4 that are from logical block 76 (sectors X+N−3, X+N−2 and X+N−1) are written in page N/4+1 along with sector X, which is copied from scratch pad block 91. Thus, in this example, the last page in metablock 72 contains a cluster fragment from the head of logical block 76 and a cluster fragment from the tail of logical block 76. In memories that do not require sequential writing of pages and that allow multiple writes to the same page, sector X could be written to page N/4−1 when it is received without being stored at another location.

The offset for this example may be calculated from the difference between a cluster boundary and a page boundary. This may be found from the difference between the current command's first logical address and the logical address of the start of the logical block. In one example, the offset may be calculated from:

Offset=(Current command's first logical address) mod (number of sectors per page)

Thus, in FIG. 9A, the current command's first logical address is X−3. Thus, the offset is:

$$Offset = (X-3) \bmod (4)$$
$$= (X-4+1) \bmod (4)$$
$$= 1$$

The offset for alignment may be from one to three sectors in this example. Generally, the offset may be from zero (if clusters are received with boundary locations that coincide with logical block boundaries) to a maximum of one less than the number of sectors per page.

FIG. 9B illustrates the realignment scheme of FIG. 9A as an offset in the logical-to-physical mapping of sectors of logical block 76 where X=0. Instead of writing the first logical sector of logical block 76 (sector X) to the first physical address in metablock 72, the first logical sector is written to the last physical address. This may be considered an offset of 1 (one) in the mapping of this sector, where the addresses of the metablock wrap-around (the first address of logical block 76 is considered sequential to the last address of logical block 76). All other sectors are also written with an offset of one. Thus, the second sector received, sector X+1 goes to the first physical address etc. The data stored in metablock 72 may be found using the offset for logical block 76 and no sector-by-sector indexing of data is required. Storage of data in metablocks using an offset (or page-tag) of this kind is further described in patent application Ser. No. 10/750,155.

The examples of FIGS. 8 and 9 show clusters and pages having four sectors each. However, the principles described may be applied to clusters and pages of various sizes. A cluster may extend over multiple pages and still be aligned to the pages. For example, a cluster of 8 sectors may be aligned to pages having 4 sectors as shown in FIG. 10. The clusters of FIG. 10 fully occupy 2 pages of metablock 72, where they could extend across 3 pages if they were not aligned. Thus, alignment may improve efficiency by reducing the number of writes per cluster from 3 to 2. In this example, every cluster boundary coincides with a page boundary, although not every page boundary coincides with a cluster boundary.

Clusters may be smaller than a page and still be aligned to the page. For example, a cluster may contain 16 sectors and a page may contain 64 sectors. Without alignment, some clusters may extend across two pages and require two write operations. With alignment, these clusters are written to a single page thus improving efficiency. In this example, every page boundary coincides with a cluster boundary, although not every cluster boundary coincides with a page boundary.

An offset for a logical block may be derived from the difference between the starting address of the data being written and the starting address of a logical block. The start of a logical block will be the start of a page and the host begins writing data at the start of a cluster. Thus, the difference between these two addresses gives the difference between a cluster boundary and a logical block boundary. The offset may be calculated from the remainder when this difference is divided by the number of sectors per page. If the remainder is zero (the difference is an integer number of pages), then the boundaries may be considered aligned. One way to store the offset of a logical block is to record the logical address of the sector stored in the first physical address of the logical block.

An offset may be derived from the logical address of the first sector of host data stored in the memory. Typically, in a DOS system, the first portion of logical address space is dedicated to system information such as a boot sector, one or more File Allocation Tables (FATs), root directory and subdirectories. Host data is stored immediately after the system information so that the first cluster begins after the end of the system information. Thus, if the logical address range of the system information is known, the location of the start of the first cluster may be obtained. The logical address range of the system information may be found from the boot sector, which records the locations of the FAT (or FATs) and directories. The boot sector also indicates the number of sectors per cluster so that all cluster boundary locations may be obtained from the boot sector.

In some systems, a memory array may be partitioned into two or more partitions that may operate separately in some respects. An individual partition of the array may have a dedicated portion of logical address space for system information for that partition. In such systems, a different offset may be derived for different partitions according to the location of the first sector of host data stored in the partition. Thus, different partitions within the same memory array may operate with different offsets so that each partition stores data with clusters aligned to pages.

According to one embodiment of the present invention, the logical block address format may include the offset (page tag) of the logical block. Thus, the physical location of a sector in a metablock may be determined without a prior block read.

Because a separate offset is maintained for each logical block, different logical blocks may have different offsets. When a host changes the cluster boundary locations the alignment changes for the new data. Previously written data in other metablocks may remain undisturbed because it does not have to be rewritten with the new alignment. The change of offset in one logical block does not have to affect the offsets of neighboring logical blocks because an offset only affects sectors within the logical address range of the corresponding logical block. The same logical address range remains mapped to a particular logical block with the offset providing alignment only within that range.

In another embodiment, the principles described above may be applied to a unit of a logical group instead of applying to a unit of a logical block. In such an embodiment, an offset is calculated for a logical group and not a logical block. A logical group is a unit of data that holds data equal to the data in one erase block of the memory array. Thus, a logical block contains an integer number of logical groups. A detailed description of logical groups is provided in U.S. patent application Ser. No. 10/841,118, entitled "Data boundary management," filed on May 7, 2004, which patent application is hereby incorporated by reference in its entirety. In some memory systems, the physical location of data in the memory may be tracked in units of a logical group. In such memory systems, an offset may be derived for each logical group. In such systems the logical group address format may include the offset for that logical group and different logical groups may have different offsets. In other embodiments, an offset may be maintained for units that have less data than in a block. For example, a unit that contains half, quarter, or some other fraction of the data of a block may be used, with a different offset derived for each unit. Thus, data may be aligned in units of different sizes.

In some memory systems offsets are provided for various reasons. For example, in U.S. patent application Ser. No. 10/750,155, an offset allows received data to be rapidly written without first copying sectors of data. Such offsets may be combined with offsets calculated according to the present invention to obtain a final offset value that is used for the storage of data. For example, where data is received that has a logical address in the middle of the logical address range of a logical block, the data may be written to the beginning of the metablock according to a first offset. However, an additional offset may align the data to the page boundaries so that the final offset is comprised of two components.

While the above is a full description of the specific embodiments, various modifications, alternative constructions and equivalents may be used. Therefore, the above description and illustrations should not be taken as limiting the scope of the present invention which is defined by the claims.

The invention claimed is:

1. A method of storing addressable data packets in a non-volatile memory array that is connected to a host, the memory array having units of erase of a block, where each block of the memory array holds one logical block of data, each logical block formed of addressable data packets extending sequentially from a first addressable data packet to a last addressable data packet, data allocated by the host in units of a cluster, each cluster including multiple addressable data packets, comprising:
    determining an offset between a logical block boundary and a cluster boundary for data received from a host for storage in a predetermined block;
    selecting physical locations in the predetermined block for writing a plurality of clusters of the received data according to the offset, such that an individual cluster boundary is located at a predetermined page boundary; and
    writing a first partial cluster that includes the first addressable data packet of a logical block of the received data and a last partial cluster that includes the last addressable data packet of the logical block of the received data to a page of the predetermined block.

2. The method of claim 1 wherein the first partial cluster and the last partial cluster are written to a sequentially last page of a plurality of sequential pages that form the predetermined block.

3. The method of claim 2 wherein the first partial cluster is stored outside the predetermined block prior to writing to the last page of the plurality of sequential pages that form the predetermined block.

4. The method of claim 1 wherein the first partial cluster and the last partial cluster are written to a sequentially first page of a plurality of sequential pages that form the predetermined block.

5. The method of claim 4 wherein the first partial cluster is directly stored in the sequentially first page of the predetermined block and subsequently the last partial cluster is also stored in the sequentially first page of the predetermined block.

6. The method of claim 1 wherein the predetermined block consists of a plurality of pages and all pages of the predetermined block, except the page containing the first and last partial clusters, contain clusters stored with a cluster boundary at a page boundary.

7. The method of claim 1 wherein the memory array consists of a plurality of blocks, each black of the plurality of blocks being a minimum unit of erase and wherein data packets of the first partial cluster and data packets of the second data cluster are stored out of logical sequence in the page.

8. The method of claim 7 where the predetermined block consists of a plurality of pages and each of the plurality of pages, except for the page, contain addressable packets of data that are stored in logical sequence.

9. A method of storing clusters of data received from a host, each cluster containing multiple addressable units of data allocated together by a host, in a non-volatile memory array having a unit of programming of a page and a unit of erase of a block, each block containing multiple pages, comprising:
    receiving a plurality of clusters of data from a host;
    mapping the plurality of clusters to blocks of the memory array without regard to the locations of cluster boundaries;
    deriving an offset between cluster boundaries and mapped block boundaries; and
    storing clusters and portions of clusters that are mapped to a predetermined block in pages within the predetermined block, in a manner dependent on the derived offset, so that boundaries between clusters occur at page boundaries, the clusters and portions of clusters that are mapped to the predetermined block having a logical address range, the logical address range being independent of the offset so that the predetermined block is filled with identical sectors regardless of the offset.

10. The method of claim 9 wherein the portions of clusters that are mapped to the predetermined block are a first portion of a first cluster and a second portion of a second cluster, the first and second portion stored together in a page of the predetermined block.

11. The method of claim 10 wherein the clusters and portions of clusters tat are mapped to the predetermined block are sequential data extending from a first logical address to a last logical address, the first portion including the first logical address and the second portion including the last logical address.

12. The method of claim 9 wherein a value is recorded that indicates the offset for the predetermined block.

13. A method of storing data that contains predefined cluster boundaries in metablocks of a non-volatile memory array, each metablock consisting of two or more erase blocks that are programmed and erased in parallel, erase blocks being the minimum unit of erase of the non-volatile memory array, each logical block consisting of data equal to the data in one metablock, each logical group consisting of data equal to the data in one erase block, comprising:

receiving data for storage in a non-volatile memory, the data consisting of multiple sequential addressable data packets;

storing a first one or more addressable data packets from a first cluster in a first location, the first cluster containing the first one or more addressable data packets from a first logical group and also containing a second one or more addressable data packets from a second logical group;

storing subsequent sequential addressable data packets in pages of a first metablock, such that page boundaries occur at cluster boundaries;

storing a third one or more addressable data packets from a last cluster with the first one or more addressable data packets in a predetermined page of the first metablock, the last cluster containing the third one or more addressable data packets from the first logical group and also containing a fourth one or more addressable data packets from a third logical group.

14. The method of claim 13 wherein the first location is in a second metablock.

15. The method of claim 13 wherein the first location is the predetermined page of the first metablock and the third one or more addressable data packets are written to the predetermined page of the first metablock subsequent to writing the first one or more addressable data packets to the predetermined page of the first metablock.

16. The method of claim 13 wherein the data in the first logical group is sequential to the data in the second logical group and the data in the third logical group is sequential to the data in the first logical group.

17. The method of claim 13 wherein the first, second and third logical groups are in a logical block that is stored in the first metablock.

18. The method of claim 13 wherein each metablock of the non-volatile memory array consists of a plurality of erase blocks, each of the plurality of erase blocks from a different plane of the memory array, each plane of the memory array having its own dedicated control circuits.

19. A memory system for storing addressable data packets sent by a host in a non-volatile storage medium, comprising:

a controller that receives addressable data packets from the host, the received addressable data packets forming clusters that are allocated to files by the host, each cluster containing multiple addressable data packets, a sequential range of the received addressable data packets mapped to a logical unit by the controller without regard to cluster locations;

a non-volatile memory array in communication with the controller, the non-volatile memory array having multiple erase blocks, erase blocks being the minimum unit of erase of the memory array, one or more erase blocks assigned to store the logical unit, the one or more erase blocks being programmable and erasable together, the one or more erase blocks containing physical locations for storage of addressable data packets, the physical locations for storage of individual ones of the range of addressable data packets selected to provide cluster-to-page alignment for clusters within the logical unit, without modifying the range of addressable data packets that are mapped to the logical unit; and wherein clusters that individually include a portion within the logical unit and a portion outside the logical unit have the portions within the logical unit stored together in a page of the logical unit without cluster-to-page alignment.

20. The memory system of claim 19 wherein cluster size is equal to page size and the portions within the logical unit occupy a complete page of the one or more erase blocks.

21. The memory system of claim 19 wherein the one or more erase blocks consists of a metablock of two or more erase blocks and the logical unit consists of an amount of data that fits exactly within the metablock.

22. The memory system of claim 19 wherein the one or more erase blocks consists of one erase block and the logical unit consists of data that fits exactly within the one erase block.

23. The memory system of claim 19 wherein the memory system is encapsulated in a memory card that is removably connected to a host.

* * * * *